Patented Dec. 21, 1926.

1,611,175

UNITED STATES PATENT OFFICE.

JOHN FEITH AND JOHN WESLEY ZIEGLER, OF KOKOMO, INDIANA, ASSIGNORS TO JAMES CLARENCE PATTEN, OF KOKOMO, INDIANA.

CELLULOSE ARTICLE AND METHOD OF MAKING THE SAME.

No Drawing. Application filed December 8, 1921. Serial No. 521,031.

This invention relates to a new and improved method for making cellulose articles and in particular to methods involving the use of copper ammonium cellulose solutions.

After considerable experimentation and research in this particular branch of the cellulose field, we have found a much quicker, more efficient, and cheaper method of making up a cupro-ammonium cellulose solution of such concentration and composition that will, in certain after steps, produce a cellulose, which has very desirable physical and chemical properties. This cellulose so produced, particularly in sheet form, has properties which are markedly different from the cellulose produced from similar solutions, as; for instance, artificial silk, which has been formed by coagulation in a chemical medium and afterwards dried.

In the process for the employment of this solution that we have developed, it is not our practice to follow the usual methods of obtaining cellulose from such cupro-ammonium solutions, namely, by chemical coagulation: but to allow our solutions to set in the air upon suitable plates, tables or belts.

By the methods heretofore used a long time is required for the proper preparation of the cupric hydrate used. The solutions prepared by our method need not be seasoned or aged before they can be used, and the expense incident to carrying a stock of solution is thereby obviated. In our method we can make up commercial batches and have the same ready for commercial use inside of five to six hours. Furthermore, our solutions are economical in the relation of the cupric hydrate to the cotton dissolved.

The following is a full and complete description of our method of preparing a cupro-ammonium cellulose solution and obtaining from the same cellulose in a useful form and of unique properties. We have found that by taking dry cupric hydroxide, commercial aqueous ammonia (sp. gr. about 0.9) and cotton linters, filter paper scrap or cotton rags, and masticating them together at ordinary temperatures, we can obtain a richer cellulose solution in a shorter time than by any of the present known methods.

A representative formula is as follows:— 910 grams ammonium hydrate (0.9 sp. gr.), 40 grams cupric hydrate, 50 grams cotton.

The ammonium hydrate is placed in a suitable container, which may, for instance, be of glass, and to this is added the cupric-hydrate while stirring. The cotton is then added while stirring. The stirring is continued for 10 minutes after the final cotton has been added and in this time the cotton is completely gelatinized, and the solution fairly viscous. The solution as prepared from the above formula is a 5% cotton solution, but we do not wish to limit ourselves to this single composition. We have found that we can readily make solutions richer in cotton and that contain up to 9% cellulose in solution. We can, of course, make solutions from any low percentage up to this point, and in doing so need only vary the relation between the ammonium hydrate solution, copper hydrate and the cotton.

Though solutions made up of the three constituents above noted will result in the production of a cellulose material having the described physical properties, yet we prefer to use an addition agent, such as glycerine, starch, glucose or the like at the time of making up the solution, as we find that the employment of same has certain corrective properties in the pouring step afterwards described, and makes the finished cellulose in sheet form smoother, freer from evaporation markings, more homogeneous, slightly softer and more elastic.

The following formula shows the amount of the addition agent employed and its relation to the other constituents, namely: 900 grams ammonium hydrate (0.9 sp. gr.), 40 grams cupric hydrate, 50 grams cotton, 10 grams glycerine.

All these solutions are made up as much as possible out of contact with the air to prevent the formation of oxy-cellulose. They are next filtered to free them from dirt and foreign matter, using a centrifuge or pressure filter for this operation. The clarified solution is then vacuum-treated for a short period of time, the solution being maintained at a temperature of about 90° F.

and by this processing the excess of ammonia is removed and afterwards recovered, there remaining in the solution approximately three to five percent by weight of ammonia gas. This solution, which may be a batch of 500 pounds, may be made up ready for pouring in five to six hours. The next step is the pouring of this material from a suitable container, provided with a slit or the like, onto the surface of a glass or metal plate or table. It is allowed to cover the surface of this level table to a predetermined depth, depending upon the thickness required and there it will set to a compact film in a time period varying between one to three hours. This time of setting depends upon the concentration of the solution and the thickness of the pour. If a metal sheet is employed, a metal, such as nickel or tin covered steel, which is not affected by this solution, must be used.

The pouring and drying table is preferably provided with means for heating from below and the temperature of the surface of the plate is maintained slightly above the room temperature. This is to offset the cooling effect of evaporation and to enable the film to dry from the bottom up, and to prevent decomposition at the bottom of mass caused by excessive cooling.

As an example of the amount required to get a given thickness of finished cellulose, if 2 cc. of 5% cotton solution are allowed to cover one square inch of plate surface, the final finished cellulose will be approximately .005" thick.

After the cupro-ammonium cellulose solution has set upon the table, it has changed from a viscous solution to a solid sheet, which is evenly translucent, of a deep blue color, and evenly thick throughout its entire area. It has a peculiar iridescent, pearly finish, and is quite tough and rubberlike to the touch. When this stage is reached, the sheet is covered with water which is allowed to remain for about fifteen minutes. This water extracts some of the ammonia still retained in the sheet. This water is then drawn off and is replaced with a weak acid solution, preferably about a 5% sulphuric acid solution. This acid-solution breaks up the copper ammonia cellulose, removing the copper and ammonium as sulphates which pass into a water solution and leave the sheet of a light whitish green color, translucent and very strong. During this step the area of the sheet shrinks considerably, in some cases amounting to approximately 20%. When this operation is finished the sheet, which was previously firmly attached to the table top, is now loose so that it can be lifted from the table. It is now placed in another weak acid bath for a period of about one hour to continue the removal of all copper and ammonia salts. It is then rinsed off with distilled water and placed in a tank supplied with running water to complete the removal of the copper and ammonium salts and free acid from the stock of the sheet.

The next operation is one in which the cellulose acquires its final form, condition and shape, and is carried out on suitable racks which hold the edges of the sheet and permit it to dry under tension. The shrinkage in this step is considerable, but occurs only in one plane, viz:—in its thickness. In this drying the thickness will change from approximately .040" to .005". The appearance of the sheet has now changed from a whitish translucent material to a water-white absolutely transparent article. The dried product is no longer soft and rubbery, but is hard enough to resist the finger nail and is fairly resilient and flexible. It will not regain its original thickness or area by reabsorption of water. If wetted for some time it will absorb some water but will regain its original dried dimension when again dried under tension.

This cellulose has many uses. It can be internally sensitized by soaking it in alkali metal bromide or iodide solutions and then in silver nitrate solution, forming within itself light-sensitive silver compounds, so that it may be used as a photographic film. Other solid pigments may be formed in its mass by substituting other impregnating baths. Such treated cellulose after drying and treatment with, for instance, glycerine can be used as an artificial leather. In fact, in many places where celluloid is now used this cellulose stock can be substituted. It is not explosively combustible like celluloid but burns like a woven cotton fabric. It is not hygroscopic.

The above described cellulose-copper-ammonium-solution can also be used in the production of artificial silks and other colloidal products, description of which is given in our other patent applications.

We claim:—

1. Process of making cellulosic sheets which consists in pouring a cupro-ammonium solution formed by adding cupric hydrate to ammonium hydrate under agitation, adding cellulosic material under agitation, filtering the resulting solution and expelling ammonia from the filtrate, spreading the solution on a smooth surface, allowing the solution to set to a compact film; drying the film; and then successively subjecting the film to the action of water, weak acid, and further rinsing with water; removing the sheet from the surface and permitting it to dry while under tension.

2. Water white transparent cellulosic sheets substantially identical with sheets obtainable by the hereindescribed process which consists essentially in mixing cupric hydrate and cellulosic material with ammonium hydrate under agitation in proportions giving a solution of cellulose containing at least 5% thereof, filtering the solution, expelling the bulk of the ammonia from the solution, spreading the solution upon a smooth surface, allowing the resulting film to set and dry; soaking the film first with water and then with acid, removing the resulting sheet from the surface and washing it with acid and water successively and drying the sheet under tension.

In testimony whereof, we affix our signatures.

JOHN FEITH.
JOHN WESLEY ZIEGLER.